Jan. 30, 1962  B. BARENYI  3,019,049
TOP FOR PASSENGER MOTOR VEHICLES
Filed May 31, 1957  2 Sheets-Sheet 1
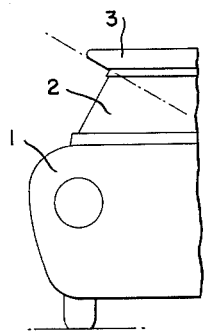
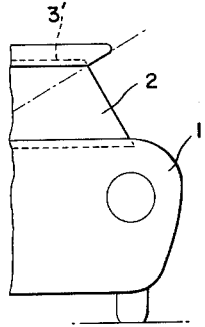
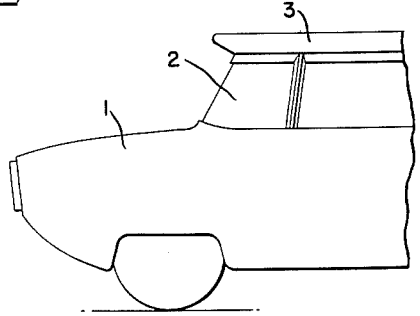
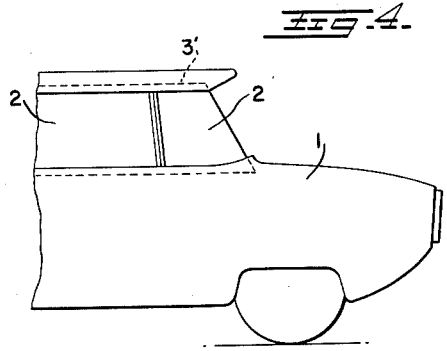
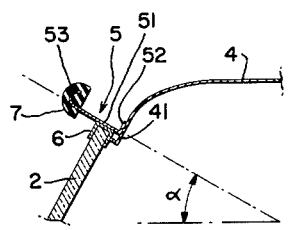
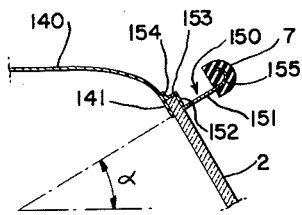
INVENTOR
BÉLA BARENYI
BY Dicke and Bray
ATTORNEYS Jan. 30, 1962 B. BARENYI 3,019,049
TOP FOR PASSENGER MOTOR VEHICLES
Filed May 31, 1957 2 Sheets-Sheet 2

INVENTOR
BELA BARENYI

BY Dicer and Craig

ATTORNEYS 3,019,049
TOP FOR PASSENGER MOTOR VEHICLES
Béla Barenyi, Stuttgart-Vaihingen, Germany, assignor to Daimler-Benz Aktiengesellschaft, Stuttgart-Unterturkheim, Germany
Filed May 31, 1957, Ser. No. 662,682
Claims priority, application Germany June 2, 1956
19 Claims. (Cl. 296—137)

The present invention relates to a passenger motor vehicle provided with a closed top, i.e., a sedan-type passenger motor vehicle, of which the roof protrudes in front and at the rear thereof beyond the windows disposed therebelow.

In passenger motor vehicles of this type of the prior art the roof terminates laterally essentially with the lateral vehicle walls. In contrast thereto, the present invention consists in that the roof is provided with a rim portion extending peripherally around the entire roof and protruding beyond the walls of the vehicle top.

The present invention offers, among others, the advantage that the passenger space is also protected laterally against the effect of the sun's rays.

Furthermore, the present invention offers a better protection against penetration of rain water with the doors or windows open as well as against leaks and seepage at the separating gaps or joints of the lateral body walls since the dripping ledge or molding for the rain water is arranged at a greater distance from the lateral walls than in the constructions used heretofore. As a result of the better protection against rain provided by a construction in accordance with the present invention, the requirements as regards accuracy in the connections of the lateral body walls with the roof are not as great in the present invention as in the prior art constructions.

According to the present invention, the top of the passenger motor vehicle may be formed in such a manner that the rim portion of the roof is either formed integrally with the roof or is fixedly secured to the roof. In the former case, the rim of the roof may consist possibly of a flanged portion of the roof, and in the latter case the rim of the roof may consist of a material different from that of the roof. Furthermore, the roof dome may be of single-walled or double-walled construction.

In a double-walled construction of the roof, the top may be appropriately formed in such a manner that the upper roof member protrudes or extends beyond the lower roof member, and that both roof members are connected with each other by means of a rim strip member. The roof may be arched or vaulted in the usual manner; possibly the upper roof member may also extend at least approximately in a planar manner.

The rim of the roof may be formed in various ways. For instance, a ledge or moulding made of flexible or yieldable material, for example, of rubber, may be arranged at the edge thereof. Moreover, the rim of the roof may also be formed as a rain gutter or channel and may be provided at the edge thereof with a dripping ledge or moulding.

In order that the rim of the roof reduces and impedes as little as possible the field of vision of the passengers, the top may appropriately be formed in accordance with the present invention in such a manner that the lower surface of the rim of the roof extends at an acute angle to the horizontal.

The windows and doors of the top may be emplaced into the rim or edge of the roof in that groove-shaped recesses formed, for example, by channel members are provided at the extensions of the roof for purposes of accommodating therein the windows and doors. Possibly, groove-shaped reinforcing channel members or strips may also be provided for that purpose at the extensions of the rim of the roof.

The present invention may find application with particular advantage in a passenger motor vehicle provided with a sliding door in that the sliding door may be suspended at the extension of the roof rim and in that guidance of the sliding door is accommodated in a non-visible manner in the roof.

In a passenger motor vehicle with a foldable door or with a trap door, the top may be appropriately so constructed that parts of the roof rim with the door are arranged at the roof in such a manner as to be foldable or swingable in the upward direction.

Accordingly, it is an object of the present invention to provide a top construction for passenger-type motor vehicles which offers added protection to the passengers within the vehicle against lateral sun rays as well as added protection against rain water penetrating into the passenger compartment.

Another object of the present invention is to provide a top construction including a roof for a passenger motor vehicle which lessens the requirements for accuracy in the connections between the lateral body walls and the roof by the fact that the joints or separating gaps are more adequately protected by the particular top construction.

Another object of the present invention is to provide a top construction for a sedan-type passenger motor vehicle in which the hinged connection as well as possibly also the guidance of a door, for example, of a slidable door, are accommodated within the rim portions of the roof in a non-visible manner.

A further object of the present invention resides in the provision of a top or roof construction for motor vehicles which is rugged and which may be readily manufactured.

A still further object of the present invention is the provision of a top construction for a sedan-type motor vehicle which reduces the cost and time required for manufacture thereof by a reduction in the requirements for accuracy in the assembly thereof.

Another object of the present invention resides in the provision of a top for passenger vehicles provided with a roof of which the rim portions are constructed in a particular manner to accommodate in groove-shaped recesses the door and windows of the vehicle.

These and other objects, features and advantages of the present invention will become more obvious from the following description when taken in connection with the accompanying drawing, which shows, for purposes of illustration only, several embodiments in accordance with the present invention and wherein:

FIGURE 1 is a front view of a symmetrical half of a first embodiment of a top construction for a passenger motor vehicle in accordance with the present invention;

FIGURE 2 is a partial side view of the passenger motor vehicle of FIGURE 1 in accordance with the present invention;

FIGURE 3 is a front view, similar to FIGURE 1, of a symmetrical half of another embodiment of a top construction for a passenger motor vehicle in accordance with the present invention;

FIGURE 4 is a partial side view of the motor vehicle of FIGURE 3;

FIGURE 5 is a cross-sectional view showing, in greater detail, a symmetrical half of one embodiment of a top construction for a passenger motor vehicle in accordance with the present invention; and FIGURES 6 through 12 are cross-sectional views, similar to FIGURE 5, of modifications of the top construction for a passenger motor vehicle in accordance with the present invention.

Figure 7:
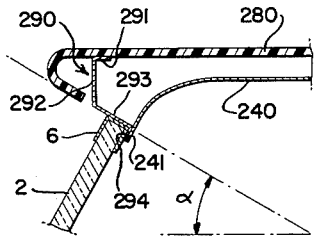

Referring now to the drawing, wherein like reference numerals are used to designate like parts, and more particularly, to FIGURES 1 and 2, reference numeral 1 designates therein the lower part of a vehicle body of a passenger motor vehicle, especially the pontoon-shaped lower part of such a body, which is provided with a closed top forming the roof therefor. The closed top is enclosed in front, to the rear, and on both sides thereof by means of window panes 2 and on top by a roof 3, properly speaking.

FIGURES 3 and 4 show a motor vehicle similar to FIGURES 1 and 2 in which the roof 3' is slightly different from that shown in FIGURES 1 and 2.

In both the embodiments of FIGURES 1 and 2, and of FIGURES 3 and 4, the lower body part 1 may be constructed in any suitable manner, for example, by making the motor vehicle symmetrical with respect to the center transverse plane of the vehicle so that both ends of the vehicle are essentially identical.

FIGURE 5 shows one embodiment of a top construction in accordance with the present invention in which the roof consists of a dome-shaped member made of metallic or non-metallic material, possibly also made of transparent material, such as Plexiglas. A separate ledge or channel member generally designated by reference numeral 5 extends around the roof along the entire periphery thereof. The ledge or channel member 5 comprises an essentially flat base portion 51, an upwardly extending flange portion 52 at the inner end thereof and a hook-shaped anchoring portion 53 at the outer end thereof. The ledge or channel member 5 is suitably secured to the outer end portion 41 of the dome-shaped roof member 4 by means of the flange portion 52 thereof, for example, by welding, bonding, gluing, cementing, bolting, riveting or the like. An essentially U-shaped channel member 6 consisting of an essentially flat base portion and perpendicularly extending leg portions is suitably secured along the flat base portion thereof to the lower surface of the base portion 51. The U-shaped channel member 6 accommodates in the channel or groove formed thereby the upper edge of the window pane 2.

A molding member 7, preferably made of elastic material, such as, for example, rubber, is suitably secured over the anchoring portion 53 of the rim ledge member 5 in any suitable manner. The molding member 7 may appropriately be so shaped that it extends downwardly into a drip molding. It should also be noted that the rim ledge member 5 is so constructed and arranged at the dome-shaped roof member 4 that the flat base portion 51 thereof forms an acute angle α with the horizontal.

In FIGURE 6, the rim ledge member generally designated by reference numeral 150 is so constructed as to form itself a groove-shaped recess or channel by means of the right-angle offset portions 152 and 153, on the one hand, which are located inwardly of the flat base portion 151 thereof, and the outer edge portion 141 of the roof member 140, on the other, to directly accommodate therein the upper edge of the window pane 2. Otherwise, FIGURE 6 is similar to FIGURE 5, and again may include a drip molding 7 made of flexible material and mounted over the hook-shaped anchoring portion 155.

FIGURE 7 shows another embodiment in which the roof is of double-walled construction. The roof is closed toward the outside thereof by an outer member 280, for example, made of non-metallic material, especially of synthetic or plastic material. The outer member 280, as shown, may be flat or may also be vaulted, and extends or projects outwardly beyond the window pane 2 of the top. The outer member 280 is bent back or beaded over downwardly along the edge thereof. The outer member 280 rests or is supported by a bearing rail member generally designated by reference numeral 290. The bearing rail member 290 includes an essentially horizontal flange portion 291 by means of which it is suitably secured to the outer member 280 of the roof. An essentially vertical base portion 292 follows the flange portion 291 and, in turn, is followed by an inwardly downwardly inclined portion 293 which terminates in an outwardly, downwardly inclined flange portion 294 by means of which each bearing member 290 is secured to the outer end portion 241 of the inner roof wall 240 in any suitable manner. The ledge or channel member 6 is again suitably connected along the base portion thereof to the lower surface of the bearer member portion 293 to accommodate in the channel or groove formed thereby the upper edge of the window pane. The inner member 240 of the double-walled roof is suitably inserted or may also possibly be omitted altogether.

Figure 8:
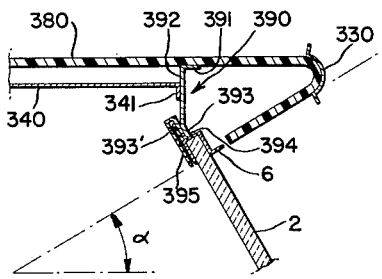

FIGURE 8 shows an embodiment which is essentially similar to that of FIGURE 7 and in which the outer member of the roof is designated by reference numeral 380 whereas the inner member of the roof is designated by reference numeral 340. The bearer rail member generally designated by reference numeral 390 is provided with an essentially horizontal flange portion 391 for connection with the outer member 380. The flange portion 391 is followed by an essentially vertical base portion 392 which in turn is followed by an essentially U-shaped channel portion consisting of two leg portions 393 and 393' and a base portion 394. The channel member 6 receiving the upper edge of the window pane 2 is connected along the base portion thereof to the lower surface of base portion 394 whereby the U-shaped channel portion of bearing rail member 390 is directed upwardly essentially in the opposite direction of the U-shaped channel member 6. The inner member 340 is provided with a flange portion 341 for connection with the vertical portions 392 of bearer member 390. A reinforcing strip 395 interconnects the leg portion 393' with the inner leg portion of channel member 6. Furthermore, the upper end of reinforcing strip 395 is bent back upon itself to extend in nested relationship between the leg portions 393 and 393' with which it may be secured in any suitable manner. A suitably constructed rain and dripping lege 330 may be emplaced over or secured in any suitable manner to the bent back portion of the outer roof member 380.

It is, of course, understood that the bearing rail members 290 and 390 of FIGURES 7 and 8, respectively, may be constructed also differently in any suitable manner so long as the necessary rigidity and ease of connection are assured thereby.

Figure 9:
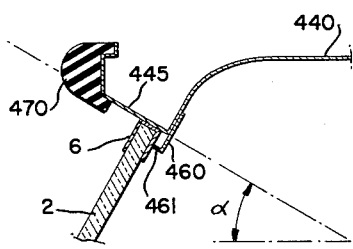

FIGURE 9 illustrates a modification of the top construction in which the roof member 440 is formed integrally with a rim ledge or channel portion 445. The roof member 440 again may be essentially dome-shaped. The rim portion 445 in turn is again provided with a protective molding 470 made of any suitable material, preferably elastic material, which may be secured thereto in any suitable manner. An essentially U-shaped channel member 6 is again secured to the lower surface of the rim portion 445, the essentially U-shaped channel member 6 again receiving the upper edge of the window pane 2. A ledge member 460 is secured along the outer surface thereof to the inner surface of the roof member 440 and constitutes with the outwardly extending projection 461 an abutment for the door. For that purpose, the ledge member 460 extends downwardly beyond the rim portion 445.

Figure 10:
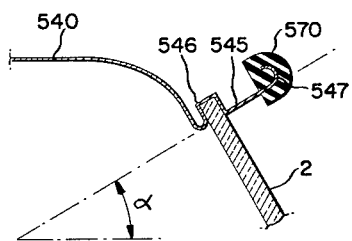

FIGURE 10 is similar to FIGURE 9 except that the rim portion 545 thereof is connected with the roof member 540 over an essentially U-shaped channel portion 546 forming a groove-shaped recess which itself accommodates the upper edge of the window pane 2. The drip molding 570 is mounted over anchoring portion 547 which is formed integrally with the other portions 545 and 546 as well as with the roof 540.

Figure 11:
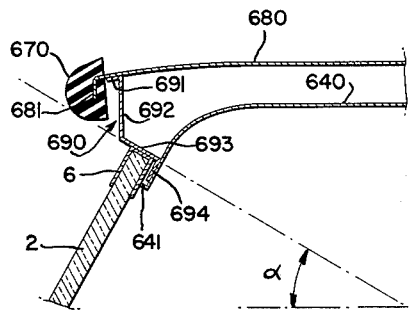

FIGURE 11 illustrates an embodiment in which the top is again of a double-walled roof construction which consists of an outer member 680 and an inner member 640 which are so dimensioned that the outer member 680 extends with the outer edge thereof outwardly beyond the outer edge of the inner member 640. The edges of both members 680 and 640 are connected by means of strip-shaped channel member generally designated by reference numeral 690 which may be constructed and formed in any suitable manner.

The member 690 is inserted between the outer member 680 and the inner member 640, and is suitably connected to the former by means of essentially horizontal flange portion 691 and to the latter by means of downwardly outwardly inclined flange portion 694. The two flange portions are connected with each other by means of a vertical portion 692 and a downwardly inwardly inclined portion 693. A separate essentially U-shaped channel member 6 is again secured along the base portion thereof to the lower surface of the portion 693 of channel member 690 and receives therein the upper edge of the window pane 2. An abutment for the door is provided by means of projection 641 of the inner roof member 640, which for that purpose extends below flange portion 694.

In FIGURE 11 the upper member 680 is provided with a downwardly extending flange portion 681 over which a protective molding 670 is mounted.

Figure 12:
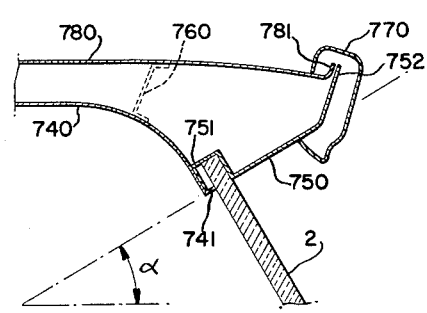

FIGURE 12, which is similar to FIGURE 11, shows a separate rim member 750 provided with an essentially U-shaped channel portion 751 forming a groove-shaped recess which directly accommodates therein the upper edge of the window pane 2. If so desired, additional reinforcing members 760 may be provided.

In FIGURE 12, the outer edges 781 and 752 of the upper member 780 and of the rim member 750, respectively, are bent upwardly and brought together to facilitate suitable connection thereof in any suitable manner, for example, by spot welding, and a protective ledge 770 surrounds the same.

The inner roof member 740 again forms a stop or abutment for the door by the outwardly projecting extension 741 thereof.

The individual parts of the roof 3 or 3′ as well as the detailed constructions of FIGURES 5 through 12 thereof may be connected with each other in any suitable manner, either rigidly, for example, by bonding, gluing, cementing or welding, or detachably, for example, by bolts or screws. The protective ledges or moldings 7, 330, 670 and 770 may be connected to the corresponding roof part by means of screws, may be clamped thereon, wedged thereon, emplaced thereon, glued thereon or the like. The rain channel or gutter formed between the rim member, such as members 5, 150, 445 or 545, and the dome-shaped roof 4, 140, 440 and 540, respectively, may be provided with drainage means at any suitable place or places of the roof. Several drain holes appropriately distributed may also be provided for that purpose.

If the top construction in accordance with the present invention is used for vehicles having slidable doors, the suspension mechanism and guidance mechanism of such slidable doors which may be of any suitable well-known construction of the prior art are suitably accommodated in the rim portion and in the roof, respectively.

While I have shown and described several preferred embodiments in accordance with the present invention, it is understood that the same is not limited thereto but is susceptible of many changes and modifications within the spirit of the present invention and I intend to cover all such changes and modifications as encompassed by the appended claims.

I claim:

1. A sedan-type passenger motor vehicle having a lower body part and a closed top comprising a roof member closing said top and having an essentially flat portion, said member further having front, rear and side terminal portions merging with and forming continuations of said flat portion, and wall means formed at least in part by window panes surrounding and secured to said terminal portions rim means extending around the entire periphery of said roof member and inclined to and protruding outwardly and upwardly from said roof member and directly over the wall means of said top a predetermined distance, said rim means and said terminal portions constituting a gutter the lower surface formed by said rim means subtending essentially an acute angle with the horizontal to maintain the field of vision for the passengers as large as possible.

2. A passenger motor vehicle according to claim 1, wherein said rim means is formed integrally with said roof member.

3. A passenger motor vehicle according to claim 1, wherein said rim means is formed by a beaded-over portion of the roof member.

4. A passenger motor vehicle according to claim 1, wherein said roof member is of double-walled construction.

5. A passenger motor vehicle according to claim 1, further comprising drip molding means made of elastic material secured to the outer edge of said rim means.

6. A passenger motor vehicle according to claim 4, wherein said double-walled construction includes an outer roof member and an inner roof member, said outer roof member protruding beyond said inner roof member and rim members constituting at least in part said rim means and interconnecting said inner and outer members along the edge portions thereof.

7. A passenger motor vehicle according to claim 6, wherein said outer member extends approximately flat over a substantial portion thereof.

8. A passenger motor vehicle according to claim 14, wherein said rim means cooperates with said terminal portions to form a rain gutter.

9. A passenger motor vehicle having a lower body part and a closed top comprising a roof closing said top and having a substantially flat portion and outwardly and downwardly extending front, rear and side terminal portions integral with said flat portions, window panes having upper portions disposed outwardly laterally of said terminal portions, said window panes being comprised in wall means forming a part of said closed top, said upper portions of said window pane being secured to and surrounding said terminal portions, and rim means extending around the entire periphery of said roof member and protruding upwardly and outwardly directly over said wall means.

10. A passenger motor vehicle according to claim 9, wherein said rim means includes a rim channel member having a part forming an acute angle with the horizontal to maintain a field of vision for the passengers as large as possible.

11. A passenger motor vehicle according to claim 10, wherein said channel member is provided with a drip moulding member of elastic material.

12. A passenger vehicle according to claim 10, wherein a second channel member is provided adjacent said rim channel member for the purpose of receiving edges of said window panes.

13. A sedan-type passenger motor vehicle having a lower body part and a closed top comprising a roof member closing said top, said roof member having an upwardly facing outer surface and front, rear and side terminal portions, said terminal portions having outer surfaces merging with said outer surface, and top further comprising wall means, window panes comprised in said wall means, the upper end portions of said window panes surrounding and being secured to said terminal portions, rim means extending around the entire periphery of said roof member, said rim means being inclined to and protruding a predetermined distance outwardly and upwardly from said roof member directly over said wall means, said rim means having a lower surface, said surface subtending essentially an acute angle with the horizontal to maintain the field of vision of the passengers as large as possible.

14. A sedan-type passenger motor vehicle having a lower body part including a closed top comprising a roof, said roof having an essentially flat outer surface and comprising downwardly and outwardly extending front, rear and side terminal portions having surfaces facing outwardly of said vehicle and forming continuations of said outer surface, said top further comprising wall means and rim means, said wall means comprising window panes, means for maintaining a large field of vision for the passengers comprising the disposition of said window panes and said rim means, the upper end portions of said window panes surrounding and being secured to said terminal portions at the said surfaces thereof, said rim means being secured to and protruding a predetermined distance outwardly and upwardly from said terminal portions directly over said wall means, said rim means having a lower surface, said lower surface subtending essentially an acute angle with the horizontal.

15. A passenger motor vehicle according to claim 14, wherein said rim means consists of a material different from that of said roof.

16. A passenger motor vehicle according to claim 14, further comprising a drip molding of flexible material enclosing the outer edge of said rim means.

17. A passenger motor vehicle according to claim 14, wherein said rim means extends around the entire periphery of said roof at about the same height.

18. A passenger motor vehicle according to claim 14, wherein said rim means is provided with means forming channel-shaped recesses receiving therein said window panes.

19. A passenger motor vehicle according to claim 14, further comprising channel-shaped reinforcing members secured to said rim means with the open channel portion extending downwardly.

References Cited in the file of this patent

UNITED STATES PATENTS

| | | |
|---|---|---|
| 175,364 | Marsh | Mar. 28, 1876 |
| 213,513 | Lines | Mar. 25, 1879 |
| 721,269 | Yale | Feb. 24, 1903 |
| 1,823,541 | Herron | Sept. 15, 1931 |
| 2,369,579 | Kobligk | Feb. 13, 1945 |
| 2,643,912 | Lyon | June 30, 1953 |
| 2,677,572 | Pickard | May 4, 1954 |
| 2,714,525 | Kessler | Aug. 2, 1955 |
| 2,734,588 | Schlumbohm | Feb. 14, 1956 |

FOREIGN PATENTS

| | | |
|---|---|---|
| 822,658 | Germany | Nov. 26, 1951 |
| 108,418 | Great Britain | Aug. 9, 1917 |
| 155,889 | Great Britain | Dec. 17, 1920 |
| 765,401 | Great Britain | Jan. 9, 1957 |